M. R. KARGE.
CUSHION POWER TRANSMITTING ELEMENT.
APPLICATION FILED MAR. 28, 1919.
1,387,726.
Patented Aug. 16, 1921.
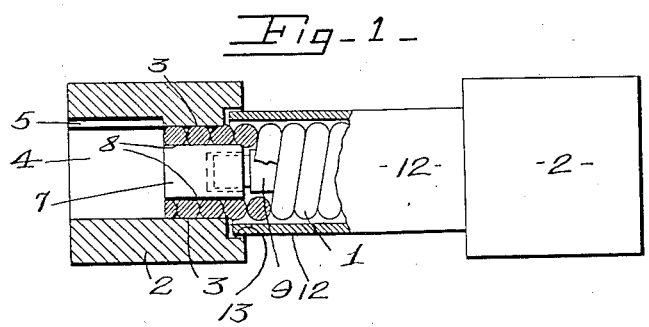
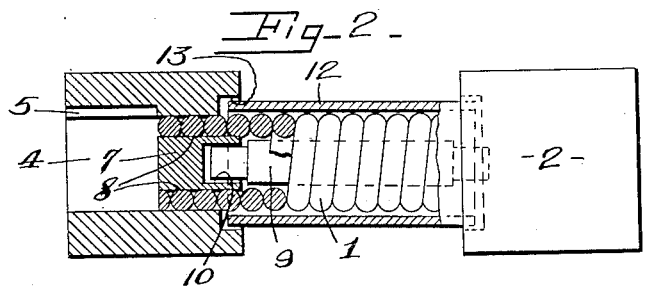
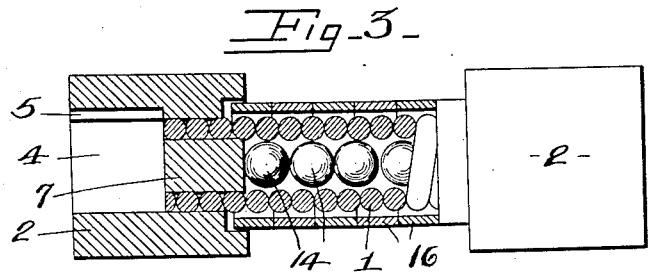
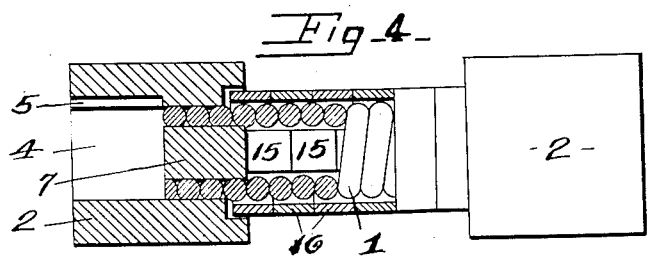
INVENTOR.
Maxwell R. Karge.
BY
Parsons Bodell
ATTORNEYS.

UNITED STATES PATENT OFFICE.

MAXWELL R. KARGE, OF PHOENIX, NEW YORK, ASSIGNOR TO THE CITIZENS NATIONAL BANK, OF FULTON, NEW YORK.

CUSHION POWER-TRANSMITTING ELEMENT.

1,387,726.  Specification of Letters Patent.  Patented Aug. 16, 1921.

Application filed March 28, 1919.  Serial No. 285,762.

*To all whom it may concern:*

Be it known that I, MAXWELL R. KARGE, a citizen of the United States, and a resident of Phoenix, in the county of Oswego and State of New York, have invented a certain new and useful Cushion Power-Transmitting Element, of which the following is a specification.

This invention has for its object a particularly simple and efficient power transmitting element or cushion coupling, which is simple in construction and highly efficient and durable in use, and also which distributes and equalizes the load, takes up the shock of a quick start, prevents fuse blow-outs and burning out of armature and field coils when used to transmit power from an electric motor, permits disalinement of the driving and driven shafts connected by the coupling, and further reduces the cost of erection of the power line or line shafting in that the erection of power line shafting is a simple job for ordinary workmen and not a precise engineering proposition.

The invention consists in the novel features and in the combinations and constructions hereinafter set forth and claimed.

In describing this invention, reference is had to the accompanying drawings in which like characters designate corresponding parts in all the views.

Figure 1 is an elevation, partly in section, of one embodiment of my power transmitting element or cushion coupling.

Fig. 2 is a similar view showing one use of my coupling when connecting shafts slightly out of alinement.

Figs. 3 and 4 are detailed views of modified forms of the floating parts of the coupling.

This power transmitting element or cushion coupling comprises a resilient coiled member, coupling pieces mounted on the end coils of said member to rotate as a unit therewith, and floating means extending lengthwise of the coiled member adjacent the same between the coupling pieces and against which the coils bind when torque is applied to said member in one direction.

1 designates the coiled member which is a coiled spring, the coils of which are preferably so arranged that when a predetermined torque has been applied thereto or the spring has been tensioned to a certain amount, the coils engage and bind on each other in a manner similar to the friction disks or plates of a disk clutch, and thus prevent breaking of the coils.

2 designates the coupling pieces which include sleeves clamped on the end coils of the coiled member 1 so as to rotate as a unit with said member and transmit the driving torque of said member from the drive shaft and transmit the torque from the said member to the driven shaft.

The sleeves 2 are preferably shrunk onto the end coils of the coiled member 1 and said end coils are faced off at 3 so as to have cylindrical surfaces on which the sleeve is shrunk. Each sleeve is also formed with suitable means for engaging the driving or driven shaft, this means being here shown as an axial socket 4 usually formed with the keyway 5 for receiving the key which locks the shaft to the sleeve 2. However, the sleeve may be also provided with set screws for locking the sleeve 2 to the driving or driven shaft, or each sleeve may be provided with any suitable means for connection with a shaft.

The coupling pieces further include a plug 7 located within the end coils of the spring, the internal faces of said coils being also faced off as at 8 so as to engage the periphery of the plug 7.

The plugs are first inserted, and the sleeves 2 then shrunk onto the end coils, thus rigidly uniting and clamping the plug within the spring and the sleeve 2 onto the spring.

In the illustrated embodiment of my invention, the floating means against which the coiled member binds when torque is applied thereto, comprises a floating piece or pieces within the coil and on which the coils contract when torque is applied to the coiled member 1 in one direction, and the floating piece or pieces encircling the coils and against which coils expand and bind when torque is applied to said coiled member 1 in the opposite direction.

The means within the coils as shown in Fig. 1 includes a floating arbor 9 loosely engaged at its ends with the plugs 7, each plug 7 being formed with an axial socket 10, and the arbor 9 being formed at each end with a reduced portion 11 which loosely telescopes in the socket 10 with sufficient looseness to permit the arbor 9 to float or tilt out of alinement with the plug without binding.

The means surrounding the coiled member against which the coils expand as shown in Fig. 1, includes a floating sleeve 12 having its ends loosely mounted or telescoped in sockets or recesses 13 with sufficient looseness to permit the sleeve to tilt out of alinement with the coupling sleeves 2 without binding thereon.

However, as seen in Figs. 3 and 4, instead of a floating arbor, consisting of a single piece, a floating element consisting of sections as balls 14 or short rollers 15 may be employed, and also instead of a single sleeve encircling the coils, a sleeve composed of sections 16 may be employed.

In some uses of this power transmitting element the coupling piece is slidably connected to its shaft so as to have an endwise movement during expansion and contraction of the coiled member.

What I claim is:

1. A power transmitting element comprising a resilient coiled spring member, coupling pieces mounted on the ends of the coiled member, and floating means arranged lengthwise of said member adjacent the same and on which said member binds when torque is applied thereto, substantially as and for the purpose described.

2. A power transmitting element comprising a resilient coiled member, coupling pieces mounted on the ends of the coiled member, and means within said member on which the coil contracts when torque is applied to said member in one direction, said means having a floating connection with said coupling pieces whereby said means are free to move laterally in all directions relatively to, substantially as and for the purpose specified.

3. A power transmitting element comprising a resilient coiled member, coupling pieces mounted on the ends of the coiled member, and floating means arranged inside and outside of said member and extending lengthwise thereof and on which said member binds when torque is applied to the same in one direction or the other, substantially as and for the purpose set forth.

4. A power transmitting element comprising a resilient coiled spring member, coupling pieces mounted on the ends of the coiled member, and a floating arbor arranged within said member and extending lengthwise thereof, substantially as and for the purpose described.

5. A power transmitting element comprising a resilient coiled member, coupling pieces mounted on the ends of the coiled member, and a floating sleeve encircling said coiled member between the couplings, substantially as and for the purpose specified.

6. A power transmitting element comprising a coiled member, plugs located in the end coils of said member, sleeves mounted on the end coils of said members to rotate therewith, and floating means within the coils of said member between the plugs and on which the coils contract when torque is applied to said member in one direction, substantially as and for the purpose described.

7. A power transmitting element comprising a coiled member, plugs located in the end coils of said member, sleeves mounted on the end coils of said member to rotate therewith, floating means within the coils of said member between the plugs and on which the coils contract when torque is applied to said member in one direction, and floating means surrounding the coils between the sleeves and against which the coils bind when torque is applied to the coils in the opposite direction, substantially as and for the purpose specified.

8. A power transmitting element comprising a resilient coiled member, plugs inserted within the coils at the ends of said member, sleeves secured on said coils at the ends of said member, and a floating arbor located in the coils between the plugs and loosely telescoping with the plugs, substantially as and for the purpose set forth.

9. A power transmitting element comprising a resilient coiled member, plugs inserted within the coils at the ends of said member, sleeves secured on said coils at the ends of said member, and a floating sleeve encircling the coiled member and loosely telescoping at its ends with the sleeves, substantially as and for the purpose described.

10. A power transmitting element comprising a resilient coiled member, a coupling piece comprising a plug inserted tightly within the coils at one end of said member, a sleeve shrunk on the coils at one end of said member, and a floating arbor located within the coils and loosely telescoping at its ends with the plugs, and a floating sleeve encircling the coils between the former sleeves and loosely telescoping at its ends with the former sleeves, substantially as and for the purpose specified.

11. A power transmitting element comprising a resilient coiled member, plugs snugly fitted within the end coils of said member, coupling sleeves mounted on said end coils of said member and being shrunk thereon and thereby uniting the sleeves and the plugs to the coiled member whereby they rotate as a unit, a floating arbor located within the coils and loosely engaged with the plugs and on which the coiled member contracts when torque is applied thereto in one direction, a floating sleeve encircling the coils and loosely united at its ends to the coupling sleeves and against which the coiled member expands and binds when torque thereto is applied in the opposite direction, substantially as and for the purpose set forth.

12. A power transmitting element comprising a coiled resilient member having its coils so arranged that they engage and bind on each other as friction plates when torque is applied to said member in one direction, and floating means arranged substantially concentric with the coils and on which the coils bind when torque is applied thereto in one direction, substantially as and for the purpose specified.

13. A power transmitting element comprising a resilient coiled member having its coils so arranged that they bind on each other as friction plates when torque is applied to said member in one direction, and a floating arbor located within the coils of said member and on which the coils contract and bind when torque is applied to said member in one direction, substantially as and for the purpose set forth.

14. A power transmitting element comprising a resilient coiled member having its coils so arranged that they bind on each other as friction plates when torque is applied to said member in one direction, and a floating sleeve encircling the coils and against which the coils expand and bind when torque is applied to the coils in one direction, substantially as and for the purpose described.

15. A power transmitting element comprising a resilient coiled member having its coils so arranged that they bind on each other as friction plates when torque is applied to said member in one direction, a floating means within the coiled member and on which the coils contract when torque is applied to said member in one direction, and a floating sleeve encircling the coils and against which the coils expand and bind when torque is applied to said member in the opposite direction, substantially as and for the purpose specified.

In testimony whereof, I have hereunto signed my name, at Syracuse, in the county of Onondaga, and State of New York, this 5th day of March, 1919.

MAXWELL R. KARGE.